US008819286B2

(12) United States Patent
Naparstek et al.

(10) Patent No.: US 8,819,286 B2
(45) Date of Patent: Aug. 26, 2014

(54) METHODS, SYSTEMS, AND APPARATUS FOR PROCESSING MESSAGING DATA SETS USING STRUCTURED DATA SETS

(75) Inventors: Dorit Naparstek, Tel Aviv (IL); Michael Guzman, Beer sheva (IL); Reuven Siman Tov, Jerusalem (IL); Moshe Eran Kraus, Mazkeret Batya (IL); Vitali Greenberg, Modiin (IL); Nitsan Amichai, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 886 days.

(21) Appl. No.: 12/907,173

(22) Filed: Oct. 19, 2010

(65) Prior Publication Data

US 2012/0096185 A1 Apr. 19, 2012

(51) Int. Cl.
G06F 15/16 (2006.01)
H04L 12/24 (2006.01)
H04L 9/08 (2006.01)

(52) U.S. Cl.
CPC .................. *H04L 41/145* (2013.01); *H04L 9/0825* (2013.01)
USPC ............................ 709/246; 709/206; 713/171

(58) Field of Classification Search
CPC ................... H04L 9/0825; H04L 9/0822
USPC ................... 709/238, 246, 206; 713/171
See application file for complete search history.

(56) References Cited

U.S. PATENT DOCUMENTS

| 6,978,316 | B2* | 12/2005 | Ghaffar et al. | 709/246 |
|---|---|---|---|---|
| 7,216,181 | B1* | 5/2007 | Jannu et al. | 709/246 |
| 7,509,649 | B2 | 3/2009 | Shenfield | |
| 7,543,024 | B2 | 6/2009 | Holstege | |
| 7,587,415 | B2* | 9/2009 | Gaurav et al. | 1/1 |
| 7,657,557 | B2 | 2/2010 | Super | |
| 7,689,709 | B2* | 3/2010 | Surma et al. | 709/236 |
| 7,720,206 | B2 | 5/2010 | Devolites | |
| 7,925,783 | B2* | 4/2011 | Allen et al. | 709/239 |
| 8,327,381 | B2* | 12/2012 | Borgendale et al. | 719/313 |
| 2002/0161801 | A1* | 10/2002 | Hind et al. | 707/513 |
| 2002/0161907 | A1* | 10/2002 | Moon | 709/230 |
| 2004/0131082 | A1* | 7/2004 | Evans et al. | 370/469 |
| 2004/0205562 | A1* | 10/2004 | Rozek et al. | 715/513 |
| 2005/0010893 | A1* | 1/2005 | Schmidt et al. | 717/103 |
| 2006/0025119 | A1 | 2/2006 | Guida | |
| 2006/0235983 | A1* | 10/2006 | Layman et al. | 709/227 |
| 2008/0294971 | A1* | 11/2008 | Allen et al. | 714/819 |
| 2009/0037225 | A1 | 2/2009 | Burchianti | |
| 2009/0150905 | A1 | 6/2009 | Lin | |
| 2011/0066757 | A1* | 3/2011 | Lee et al. | 709/246 |
| 2011/0145685 | A1* | 6/2011 | Allen et al. | 714/819 |

* cited by examiner

Primary Examiner — Frantz Jean
(74) Attorney, Agent, or Firm — Benjamin M. Searle

(57) ABSTRACT

In one embodiment, a plurality of data conversion modules are bound to a processing engine and a first messaging data set is provided to a conversion module from the plurality of conversion modules. The messaging data set conforms to a messaging format. A structured data set based on a first data portion and a second data portion of the first messaging data set are received and value different from the value of the first data portion is stored within a first element of the structured data set. The value of the second data portion is stored within a second data element of the structured data set. A second messaging data set is then generated based on the structured data set.

15 Claims, 11 Drawing Sheets

METHODS, SYSTEMS, AND APPARATUS FOR PROCESSING MESSAGING DATA SETS USING STRUCTURED DATA SETS

BACKGROUND

Analysis of network traffic is often complicated by the wide variety of messaging formats used by network services. Tools used to analyze and/or simulate network traffic (or network traffic tools) typically include support (i.e., functionality to interpret) some subset of these messaging formats. Thus, network traffic tools can interpret network traffic that conforms to any of the supported messaging formats.

However, messaging formats used by few network services—or even a single network service—are difficult to support in network traffic tools due to the limited market for network traffic tools supporting such messaging formats. Proprietary messaging formats are also difficult to support in network traffic tools due to a lack of available information regarding such messaging formats. As a result, users of network traffic tool are often unable to access network traffic tools that meet their needs or are compelled to incur the costs of development of custom network traffic tools.

DETAILED DESCRIPTION

Figure 1:
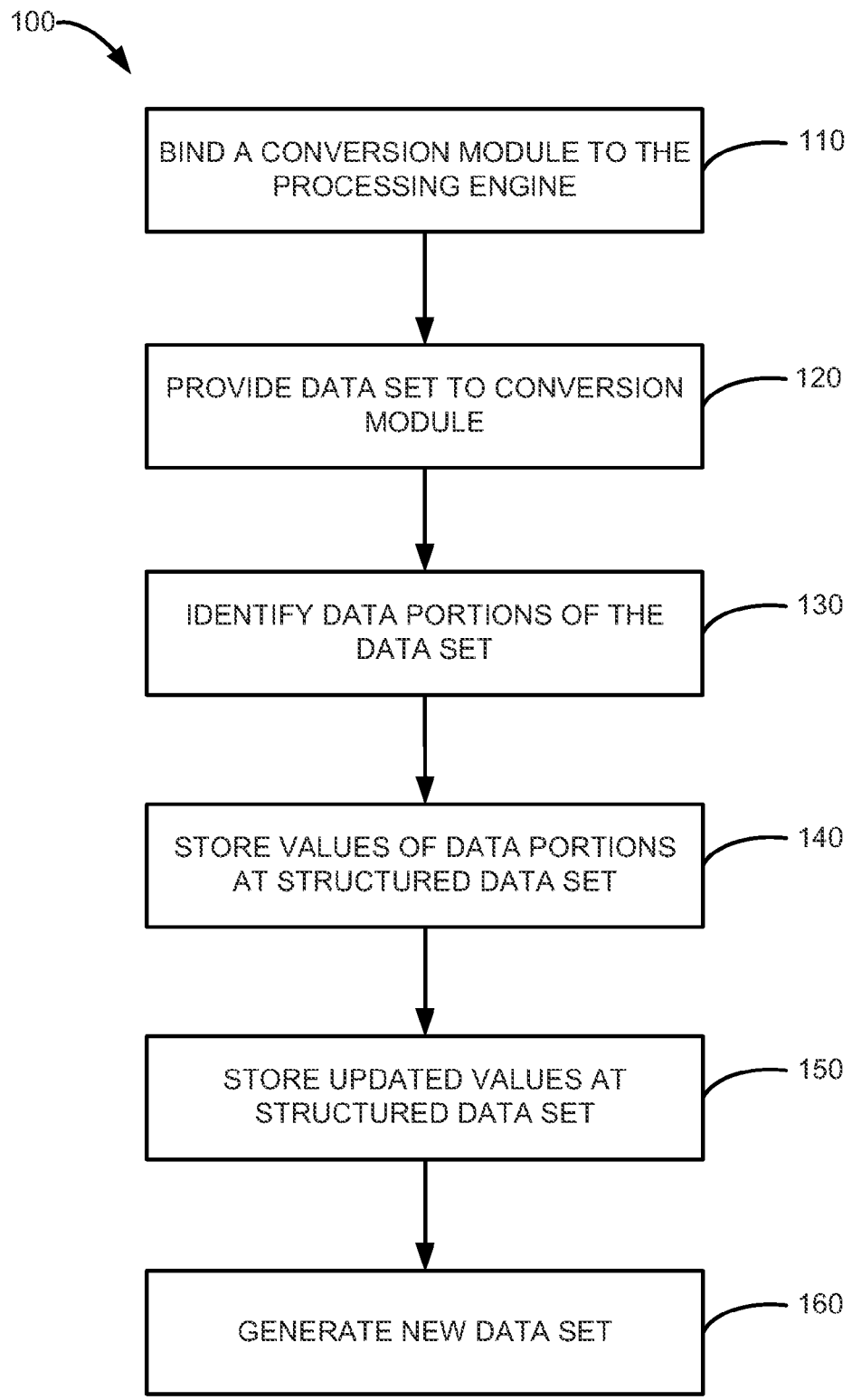
FIG. 1 is a flowchart of a process to manipulate a data set using a structured format, according to an embodiment.

Network services (e.g., web services, applications services, email services, storage services, data processing services, and/or other services) interact with network clients via communication sessions. A communication session includes the information (or data) exchanged between a network service and a network client. For example, a request sent from a web browser (a network client) to a web server (a network service) for a webpage stored at that web server and a response from the web server to the web browser including the webpage is a communication session.

Data exchanged between network services and network clients during a communication session can be captured (or recorded) by various kinds of network traffic tools (e.g., devices and/or software modules hosted at the devices that receive or intercept copies of data transmitted to and/or from network services) and analyzed to identify and/or correct improper operation of the network clients and/or network service. Additionally, proper operation of network clients and/or network services can be verified based on analysis of such data. In other words, communication sessions can be recorded and analyzed to verify that network servers and network clients operate as expected.

Some network traffic tools can also replay communication sessions from the perspective of a network client to test a network service. In other words, a network traffic tool can send to a network service data sent from a network client to a network service during a previous communication session that was recorded at the network traffic tool. Thus, the network traffic tool can simulate a network client during a communication session between the network traffic tool and a network service.

Additionally, a network traffic tool can simulate multiple network clients concurrently. For example, a network traffic tool can send to a network service multiple copies of data sent from a network client to a network service during a previous communication session that was recorded at the network traffic tool. Simulation of multiple network clients can be useful to test how well a network service handles or supports multiple concurrent network clients. In other words, simulation of multiple network clients can be useful to test a network service under load.

Network services, however, can communicate with network clients using many different protocols. For example, a first network service can define a first messaging format in which information is exchanged between the first network service and network clients communicating with the first network service, a second network service can define a second messaging format in which information is exchanged between the second network service and network clients communicating with the second network service, and so on. Thus, network traffic tools are typically arranged to support or interpret (i.e., understand) many messaging formats.

Due to diversity in the number, types, and versions of network services (and the messaging formats used by network service) available and the rate at which new network services are developed, network traffic tools are rarely able to support or interpret (i.e., understand) all the messaging formats in use. For example, manufacturers of network traffic tools may be unable to justify the cost of providing support in network traffic tools for messaging formats that are not in common use. Furthermore, some messaging formats are proprietary. Thus, a user of a network traffic tool can have a need for support for a proprietary messaging format used by network services of that user, but that need cannot be met absent disclosure of the proprietary messaging format to a manufacturer of the network traffic tool or internal development of a network traffic tool for the proprietary messaging format.

Embodiments discussed herein can provide extensible network traffic tools. Such network traffic tools can dynamically bind (or load) conversion modules to convert data sets that conform to various messaging formats into a structured data set that is interpreted, and in some cases may be replayed, by the network traffic tools. For example, a network traffic tool can have access to a conversion module library that includes a group of conversion modules. Each conversion module can convert data sets that conform to a messaging format to structured data sets that conform to a structured format. Said differently, each conversion module can be specific to a particular messaging format and convert data sets conforming to that messaging format to structured data format conformation to a common structured format. Thus, the network traffic tool interprets the structured format rather than various messaging formats. In some embodiments, a conversion module can convert data sets that conform to multiple messaging formats to structured data sets that conform to a structured format. For example, a single conversion module can convert data sets that correspond to one or both of two different messaging formats to structured data sets that conform to a common (or the same) structured format.

Because the conversion modules can be bound to the network traffic tool during operation of the network traffic tool, the conversion modules can be developed (e.g., defined or generated) separate from the network traffic tool itself. Thus, one party (e.g., a network traffic tool manufacturer) can develop the network traffic tool and a different party (e.g., a user of the network traffic tool) can develop and/or provide the conversion module for a particular messaging format.

For example, the operator of a network service with a proprietary messaging format can purchase a network traffic tool and develop a conversion module to convert data sets conforming to the proprietary messaging format to structured data sets conforming to the structured format for that network traffic tool. Thus, the network service operator need not disclose the proprietary format to the manufacturer of the network traffic tool or develop a proprietary network traffic tool. Rather, the network service operator defines within the conversion module a conversion process between the messaging format and the structured format.

Furthermore, a structured format for data sets processed by a network traffic tool allows development of standardized instruction, command, or code sets (i.e., scripts) used to process the data sets. Said differently, scripts (i.e., the sequences of instructions that are executed or interpreted at a network traffic tool) can reference information contained in data sets conforming to different messaging formats as a common data element of structured data sets. In other words, scripts that are used to process the data sets can refer to data elements of structured data sets that are consistent (i.e., have a common structured format) for the data sets processed by the network traffic tool. Thus, scripts for processing data sets at network traffic tools can be developed or defined without reference to messaging formats.

As used herein, the singular forms "a," "an" and "the" include plural referents unless the context clearly dictates otherwise. Thus, for example, the term "network service" is intended to mean one or more network services or a combination of network services. Additionally, as used herein, the term "module" refers to circuitry and/or software, firmware, programming, machine- or processor readable instructions, commands, or code that are stored at a memory and executed or interpreted at a processor.

FIG. 1 is a flowchart of a process to manipulate a data set using a structured format, according to an embodiment. Process 100 can be implemented as a hardware module and/or a software module. For example, process 100 can be implemented as application-specific circuitry or as a software module including instructions stored at a memory and executed at a processor in communication with the memory. More specifically, for example, process 100 can be implemented at a processing engine stored at a memory and executed at a processor.

A conversion module is bound to the processing engine at block 110. A conversion module can be, for example, a software module stored at a memory and executed at a processor. For example, a conversion module can be a shared or loadable software module such as a dynamically loadable library module. Thus, the processing engine can bind to the conversion module dynamically (i.e., during operation of the processing engine). In other words, the processing engine can select a conversion module for a particular data set and access (or use) that conversion module to manipulate (e.g., alter), interpret, and/or otherwise process that data set. Furthermore, the processing engine can be bound to multiple conversion modules to process various data sets in different formats.

In some embodiments, the processing engine can execute within an environment such as an operating system that provides an interface such as, for example, an application programming interface ("API") to bind a conversion module to a processing engine. Said differently, the binding of the conversion module to the processing engine can be facilitated by an environment such as, for example, an operating system. For example, the conversion module can be loaded by the processing engine as a dynamically loadable library within the environment, can communicate with the processing engine via a shared memory interface defined by the environment, can communicate with the processing engine via message passing through an environment, and/or can otherwise be bound to the processing engine. As a specific example, a conversion module can be a dynamic-link library (DLL) file within a Microsoft Windows® environment.

After the conversion module is bound to the processing engine, the processing engine provides the data set to the conversion module at block 120. For example, the data set can be provided to the conversion module at block 110 via a communication interface or API.

After the processing engine has provided the data set to the conversion module, the conversion module identifies data portions of the data set at block 130. In other words, the processing engine can provide the data set to the conversion module and the conversion module identifies various sections of the data set. For example, a data set can be a messaging data set that includes data exchanged between a server and a client of that server. That data set is formatted according to a messaging format of the server and/or client. Said differently, the data set is a message (or group of data) that includes information formatted according to a messaging format of the server and/or client. The messaging format defines and/or describes various fields in which information is exchanged between the client and the server. The conversion module identifies such fields or groups of such fields as data portions of the data set. For example, the conversion module can parse the data set and select the values stored at the various fields of the data set that are defined by the format of the data set.

The conversion module then stores the values of the data portions at data elements of a structured data set at block 140. In other words, the conversion module rearranges and/or groups the data portions of the data and stores the data portions at the structured data set. The structured data set is a data set that has a structured format. For example, the structured data set can define data elements that are delimited by lines, tab, commas, and/or some other symbol or combination of symbols. As another example, a structured data set can have a structured format such as a markup format in which data elements are delimited (or annotated or separated) by text (e.g., ASCII values) identifiers (or markups or tags) of the data elements. For example, a structured data set can be an extensible markup language ("XML") document or a combination of XML elements and/or attributes within an XML document and the XML Path Language ("XPATH") can be used to access particular data elements of the structured data set. The processing engine stores new (or updated) values at the data elements of the structured data set at block 150. Said differently, the processing engine can identify data portions of the data set stored at data elements within the structured data set by referring to the data elements of the structured data set. The processing engine then alters or manipulates the values of those data portions by altering or manipulating the values stored at the data elements of the structured data set. Thus, the processing engine can alter or manipulate the values of the data portions of the data set independent of the format of the data set.

For example, in some embodiments the structured format of the structured data set is identical for various messaging formats. In other words, messaging data sets having different messaging formats can be converted or reformatted to structured data sets—that each have a common (i.e., the same) structured format—by multiple conversion modules bound to a processing engine. For example, each of the messaging data sets can include a username and a password, but the messaging formats can dictate that the username and password are located in different data portions (or fields) of each of the messaging data sets. The conversion modules can identify the username and password in each messaging data set and store the username and password for each messaging data set in a common data element of the structured data set for each messaging data set. Thus, the processing engine can access (e.g., read, alter, or manipulate) the username and password from each messaging data set at a single data element (e.g., the common data element used to store the usernames and passwords) of the structured data set for (or representing) each messaging data set. Therefore, the processing engine can access the usernames and passwords independent of the messaging formats of the messaging data sets.

After the values of data elements of the structured data set are updated, altered, manipulated, and/or modified at block 150, a new data set is generated in the original format (i.e., the format of the data set from block 130). For example, the conversion module bound to the processing engine at block 120 can generate a data set in the original format from the data elements of the structured data set. In other words, the conversion module converts data sets from the original format (i.e., a messaging format) to the structured format and/or from the structured format to the original format.

Thus, the processing engine can process (e.g., access, update, alter, manipulate, and/or modify) the values of data portions of data sets of various different formats without interpreting those formats. Said differently, the processing engine can process information (or data) from data sets in a standard (or common for each data set) structured representation (i.e., the structured format) of that information, and a conversion module can convert the information between an original format of the information and a structured format. The structured format can be, for example, a common markup (e.g., an XML) representation of the data sets such that the data sets of the various different formats are each converted to markup representations of those data sets (e.g., each data set is converted to an XML document). Said differently, each data set can be converted, for example, to an XML document and the processing engine can process the XML documents. In some embodiments, the structured data set can define a common set of data elements into which the data portions of the various different formats are mapped. The data sets can then be converted to structured data sets by copying the data portions of each data set to the data elements within the structured data sets to which the data portions are mapped.

Process 100 can include blocks in addition to those illustrated in FIG. 1. Additionally, one or more blocks can be rearranged. For example, process 100 can include a block (not shown) in which the data set is received via a communications interface from a communications link, and a block in which the new data set generated at block 160 is transmitted via a communications interface to a communications link. Furthermore, although process 100 is discussed above with reference to an example environment including a processing engine, process 100 is applicable within other environments.

In some embodiments, multiple conversion modules can be used to convert data sets from multiple data formats into a common structured format. For example, a first conversion module can convert data sets conforming to a first messaging format to XML documents (i.e., structured data sets) having tags related to data elements of these data sets. For example, each tag can have an identifier that describes the data element of the first messaging format related to that tag. Similarly, a second conversion module can convert data sets conforming to a second messaging format to XML documents (i.e., structured data sets) having tags related to data elements of these data sets. For example, each tag can have an identifier that describes the data element of the second messaging format related to that tag. Thus, a processing engine can access values included in the data sets conforming to the first messaging format and to the second messaging format by accessing the XML documents. The processing engine can use a tree-based model (e.g., Document Object Model ("DOM")), an event-driven model (e.g., Simple API for XML (SAX)), and/or other parsing of the XML documents to access values from the data sets.

As another example, a first messaging format can define a first messaging data set that includes a session key data portion, a first payload data portion, a second payload data portion, and a time data portion. A second messaging format can define a second messaging format that includes a first payload data portion, a second payload data portion, a third payload data portion, a session key data portion, and a time data portion. A structured format can define a structured data set that includes a session key data element, a time data element, and a payload data element. A first conversion module can convert the first messaging data set to a first structured data set conforming to the structured format by: storing the value of the session key data portion of the first messaging data set at the session key data element of the first structured data set; storing the value of the time data portion of the first messaging data set at the time data element of the first structured data set; and storing the first payload data portion and the second payload data portion of the first structured data set at the payload data element of the first structured data set. A second conversion module can convert the second messaging data set to a second structured data set conforming to the structured format by: storing the value of the session key data portion of the second messaging data set at the session key data element of the second structured data set; storing the value of the time data portion of the second messaging data set at the time data element of the second structured data set; and storing the first payload data portion, the second payload data portion, and the third payload data portion of the second messaging data set at the payload data element of the second structured data set. Thus, messaging data sets conforming to different messaging formats can be converted to structured data sets conforming to a common structured format.

Figure 2:
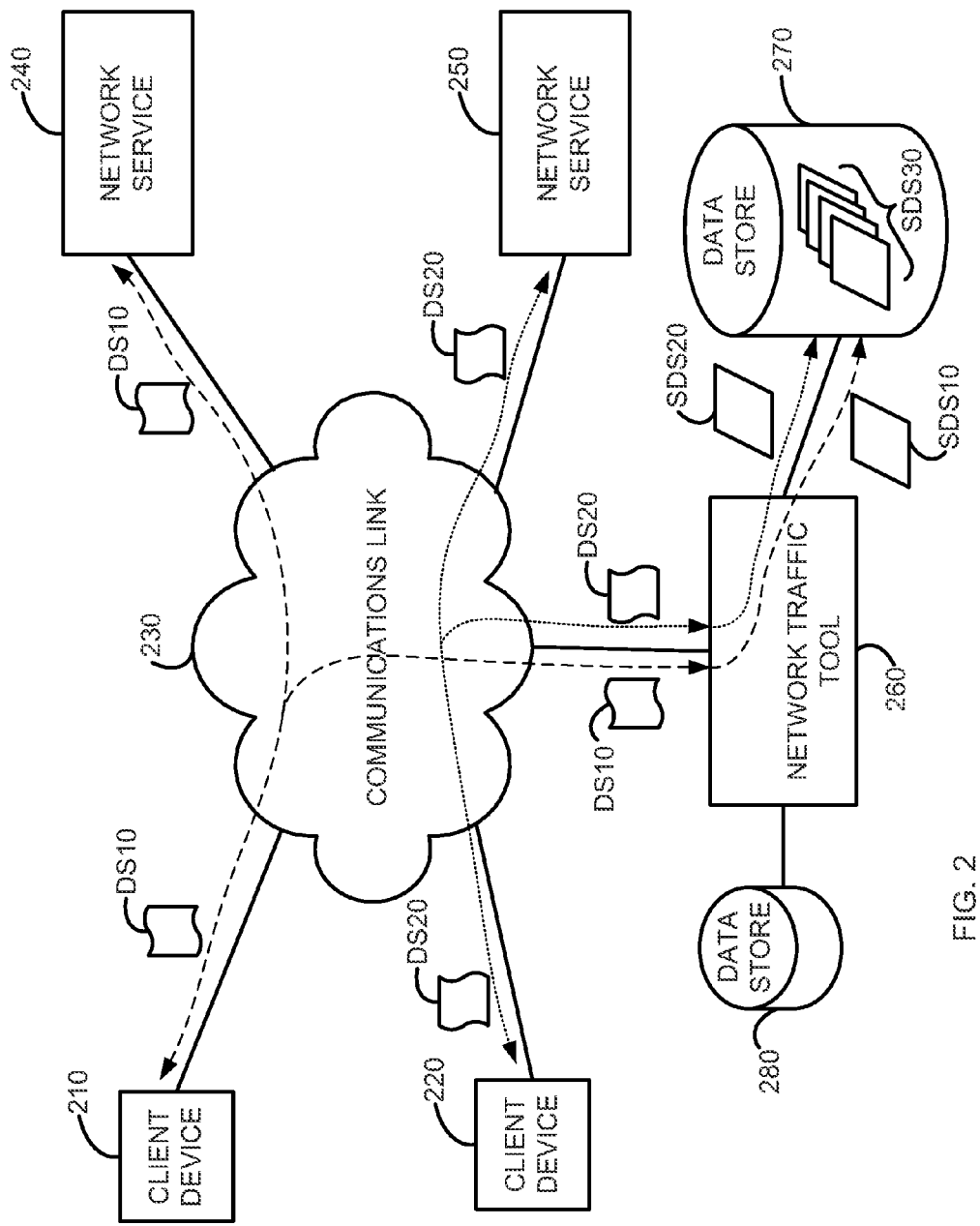
FIG. 2 is a schematic block diagram of a system to store data sets having various formats using a structured format, according to an embodiment.

FIG. 2 is a schematic block diagram of a system to store data sets having various formats using a structured format, according to an embodiment. The system illustrated in FIG. 2 includes client device 210, client device 220, network service 240, network service 250, network traffic tool 260, and communications link 230. The system of FIG. 2 is illustrated logically rather than physically. In other words, the placement of and connections among the elements of the system (e.g., client device 210, client device 220, network service 240, network service 250, network traffic tool 260, and communications link 230) represent logical relationships between the elements rather than their physical configuration. For example, network service 240 and network service 250 can be hosted as applications, virtual machines, and/or applications within virtual machines at a single computing device such as a computer server. Said differently, the placement of and connections among the elements of the system illustrate communication of data symbols or data signals transmitted within the system.

Communications link 230 can include any connector and/or system that allow client devices 210 and 220 to communicate with network services 240 and 250. For example, communications link 230 can be one or more of a cable (e.g., telecommunication cable, twisted-pair cable, coaxial cable, or fiber-optic cable), wireless link or connection (e.g., radio-frequency link, wireless optical link, or infrared link), or any other connector or system that supports transmission of communications symbols. Additionally, communications link 230 can include a communications network or combination of communications networks capable of transmitting information (e.g., symbols or signals representing data) such as, for example, an Ethernet network, a fiber-optic network, a wireless network, an intranet, and/or the Internet.

In some embodiments, communications link 230 can include multiple communications links and/or communications networks operatively coupled one to another by, for example, bridges, routers, switches, hubs, and/or gateways. For example, client device 210 can be operatively coupled to a cellular network (not shown) and network service 240 can be operatively coupled to a fiber-optic network (not shown). The cellular network and fiber-optic network can each be operatively coupled one to another via one or more network bridges, routers, switches, and/or gateways such that the cellular network and the fiber-optic network are operatively coupled to form a communications link. Alternatively, the cellular network and fiber-optic network can each be operatively coupled one to another via one or more additional networks. For example, the cellular network and the fiber-optic network can each be operatively coupled to the Internet such that the cellular network, the fiber-optic network and the Internet are operatively coupled to form a communications link.

Figure 3:
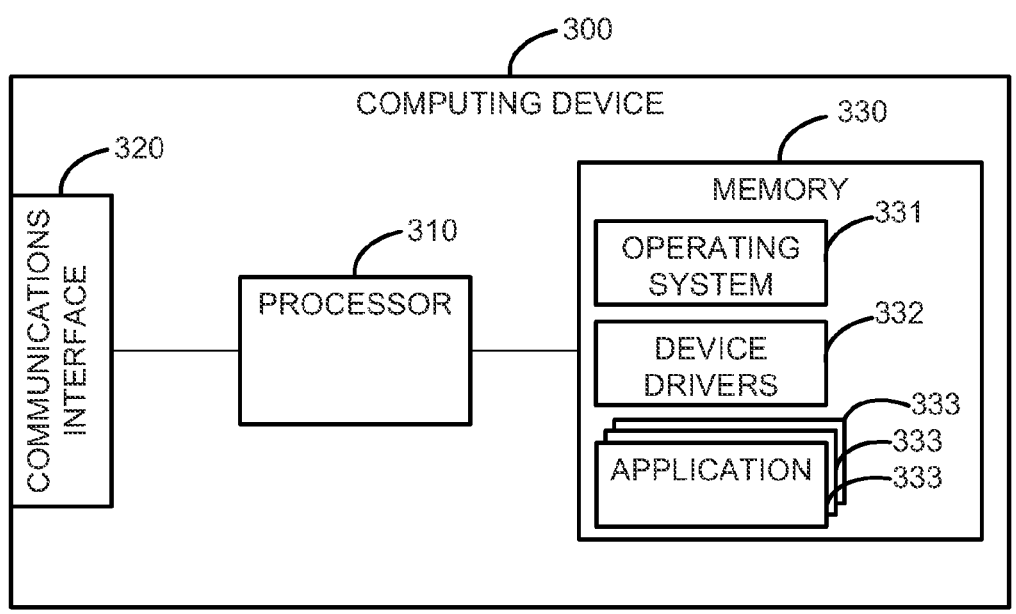
FIG. 3 is a schematic block diagram of a computing device, according to an embodiment.

Client devices 210 and 220 are each a computing device such, for example, as a personal computer, a portable computer, a mobile device such as a personal digital assistant ("PDA") or a smartphone, or some other computing device. FIG. 3 illustrates a schematic block diagram of a computing device, according to an embodiment. As illustrated in FIG. 3, computing device 300 includes communications interface 320, processor 310, and memory 330. Processor 310 is operatively coupled to communications interface 320 and memory 330. Typically, as illustrated in FIG. 3, memory 330 includes instructions or codes (e.g., computer codes or object codes) defining software modules that are executed by processor 310 during operation of computing device 310. For example, memory 330 includes instructions that define operating system 331, device drivers 332, and applications 333 (e.g., software application programs). In other words, operating system 331, device drivers 332, applications 333, and other software modules stored as instructions (not shown) at memory 330 and executed at processor 310 are hosted at computing device 300. Furthermore, data sets (not shown) such as messaging data sets and structured data sets can be stored within memory 330.

Communications interface 320 is an interface accessible to processor 310 to communicate with (i.e., transmit symbols representing data to and receive such symbols from) other processors and/or computing devices via a communications link. In other words, communications interface 320 can receive data from processor 310 and transmit symbols representing that data via a communications link. Moreover, communications interface 320 can receive symbols from other communications interfaces via a communications link and send data represented by those symbols to processor 310. For example, communications interface 320 can be a telephone network interface, a twisted-pair network interface, a coaxial network interface, a fiber-optic network interface, a wireless network interface such as a wireless local area network ("WLAN") or a cellular network, and/or some other network or communications interface.

Referring to FIG. 2, network services 240 and 250 are services such as, for example, web services, applications services, email services, storage services, data processing services, and/or other services accessible to client devices 210 and 220 via communications link 230. Each of network services 240 and 250 can be implemented as a hardware module and/or a software module. For example, each of network services 240 and 250 can be implemented as application-specific circuitry or as a software module including instructions stored at a memory and executed at a processor in communication with the memory. More specifically, for example, network service 240 can be an instant messaging service hosted at a computing device (e.g., a computer server) via which client device 210 sends instant messages to and receives instant messages from other clients of network service 240. In other words, network service 240 can be an instant messaging server application hosted at a computer server. Similarly, as another example, network service 250 can be a web server application hosted at a computer server, and client device 220 can access web pages at network service 250 via communications link 230 and a web browser (i.e., an Internet browser) hosted at client device 220.

Network traffic tool 260 records, modifies, and/or analyzes data sets (e.g., data packets, data cells, and/or other groups of data symbols or signals) transmitted via communications link 230. Network traffic tool 260 can also send data sets via communications link 230. For example, network traffic tool 260 can send, via communications link 230, data sets previously transmitted via communications link 230. Said differently, network traffic tool 260 can replay data sets transmitted via communications link 230. In some embodiments, network traffic tool 260 can replay modified data set (i.e., data sets previously transmitted via communications link 230 and subsequently modified at network traffic tool 260). Furthermore, network traffic tool 260 is implemented as a hardware module and/or a software module. For example, network traffic tool 260 can be implemented as application-specific circuitry or as a software module including instructions stored at a memory and executed at a processor in communication with the memory.

Data stores 270 and 280 are accessible to network traffic tool 260 and can store data such as data sets transmitted via communications link 230 and parameters and/or field values used at network traffic tool 260 to modify data sets transmitted via communications link 230. Data stores can be hard disks, databases, object-based storage devices, and/or other devices, services, or media at which network traffic tool 260 can store and access data. Although data stores 270 and 280 are illustrated as connected to network traffic tool 260, data stores 270 and/or 280 can be indirectly connected to network traffic tool 260. For example, data stores 270 and/or 280 can be accessible to network traffic tool 260 via a storage area network ("SAN").

As illustrated in FIG. 2, client device 210 is in communication with network service 240 via communications link 230. More specifically, client device 210 sends and receives data sets that conform to a messaging format to and from, respectively, network service 240. A messaging format defines and/or describes the order in which and/or representation of information exchanged within a communications protocol of a network service. In other words, the messaging format describes the layout (e.g., data fields) of data sets sent to and/or received from a network service. Data sets that conform to a messaging format can be referred to messaging data sets.

As a specific example, client device 210 sends messaging data set DS10 to network service 240 via communications link 230. As data set DS10 traverses communications link 230, a copy of data set DS10 is sent to network traffic tool 260. For example, communications link 230 can include a router, switch, gateway, or other device that is configured to forward messaging data sets to network traffic tool 260. As another example, network traffic tool 260 can be hosted at a computing device that also hosts network service 240 and can receive messaging data sets from that computing device. As a more specific example, a firewall, network communications stack, and/or other software module also hosted at that computing device can send a copy of data set DS10 to network traffic tool 260.

Network traffic tool 260 receives data set DS10 and converts data set DS10 into structured data set SDS10 at one or more conversion modules. Structured data set SDS10 is then stored at data store 270. As discussed above in relation to FIG. 1, a structured data set is a data set that has a structured format. For example, the structured data set can be a define data elements that are delimited by lines, tab, commas, and/or some other symbol or combination of symbols. As another example a structured data set can have a structured format such as a markup format in which data elements are by text identifiers of the data elements. For example, a structured data set can be an extensible markup language ("XML") document or a combination of XML elements and/or attributes within an XML document.

Figure 4:
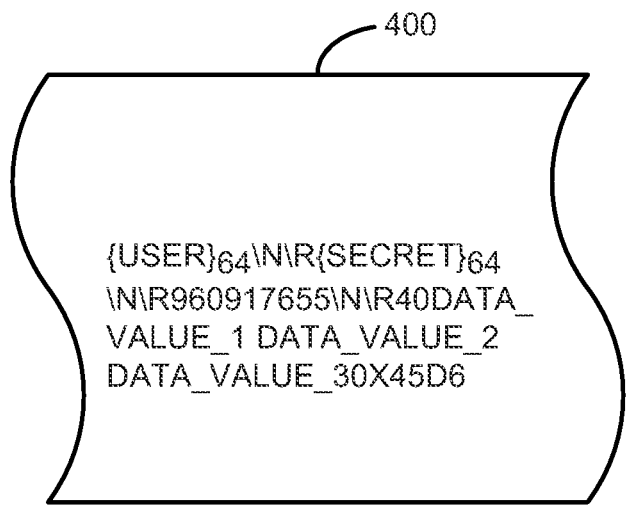
FIG. 4 is an illustration of a messaging data set conforming to a messaging format, according to an embodiment.

As examples of various messaging data sets and structured data sets, FIGS. 4, 5, 6A, and 6B are illustrations of messaging data sets and structured data sets. FIG. 4 is an illustration of a messaging data set conforming to a messaging format, according to an embodiment. The messaging format of messaging data set 400 defines the fields having the values discussed below, the representation of the values at these fields, and the arrangement of these fields. As illustrated in FIG.4, messaging data set 400 includes the following information:
 a username value, USER, encoded using a base64 encoding;
 a password value, SECRET, encoded using a base 64 encoding and separated from the username value by newline, \N, and carriage return, \R, symbols;
 a date/time value, 960917655, encoded as an integer representing POSIX time and separated from the password value by newline, \N, and carriage return, \R, symbols;
 a data bytes value, 40, representing the number of data (or payload) bytes to follow and separated from the date/time value by newline, \N, and carriage return, \R, symbols;
 a set of data values, DATA_VALUE_1, DATA_VALUE_2 and DATA_VALUE_3, separated one from another with space character, " "; and
 a checksum value, 0x45D6, calculated from the data values and represented as a 16-bit hexadecimal number.

Figure 5:
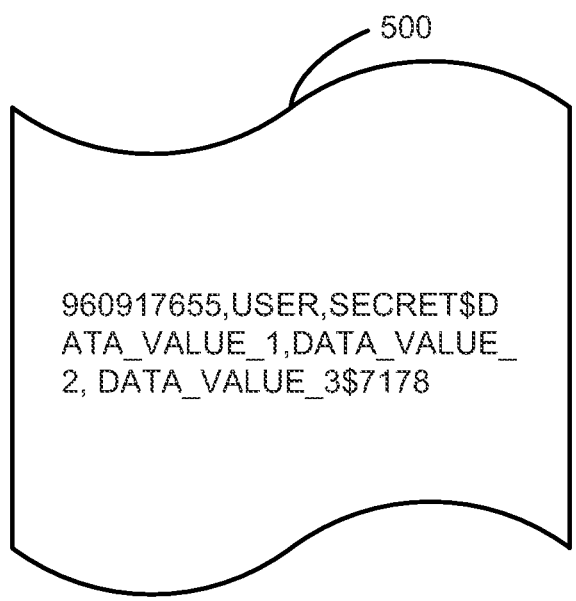
FIG. 5 is an illustration of another messaging data set conforming to another messaging format, according to an embodiment.

FIG. 5 is an illustration of another messaging data set conforming to a messaging format, according to an embodiment. The messaging format of messaging data set 500 differs from the messaging format of messaging data set 400 and defines the fields having the values discussed below, the representation of the values at these fields, and the arrangement of these fields. As illustrated in FIG. 5, messaging data set 500 includes the following information:
 a date/time value, 960917655, encoded as an integer representing POSIX time;
 a username value, USER, in plain text (i.e., ASCII values) and separated from the username value by a comma, ',', character;
 a password value, SECRET, in plain text (i.e., ASCII values) and separated from the username value by a comma, ',', character;
 a set of data values, DATA VALUE 1, DATA VALUE 2 and DATA VALUE 3, separated one from another with comma character, ',', and from the password value by a separation symbol, '$'; and
 a checksum value, 7178, separated from the set of data values by a separation symbol, '$,'calculated from the set of data values, and represented as a 16-bit unsigned decimal number.

Figure 6A:
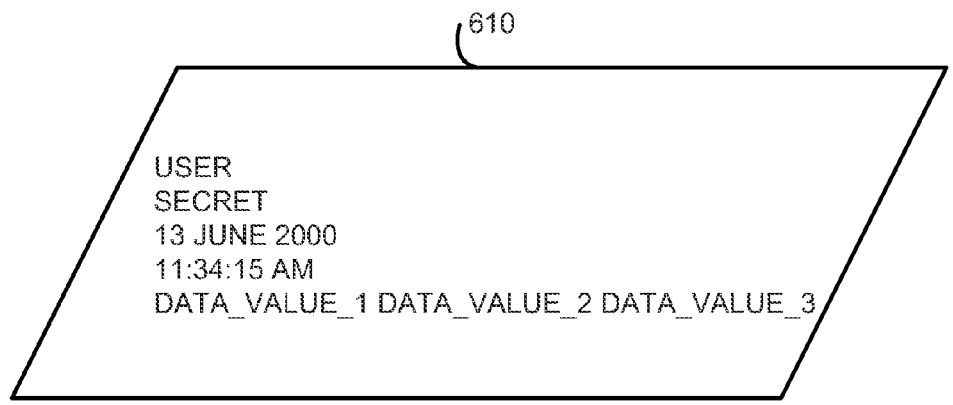
FIGS. 6A and 6B are illustrations of structured data sets conforming to different structured formats and including information from the messaging data sets illustrated in FIGS. 4 and 5, according to embodiments.
Figure 6B:
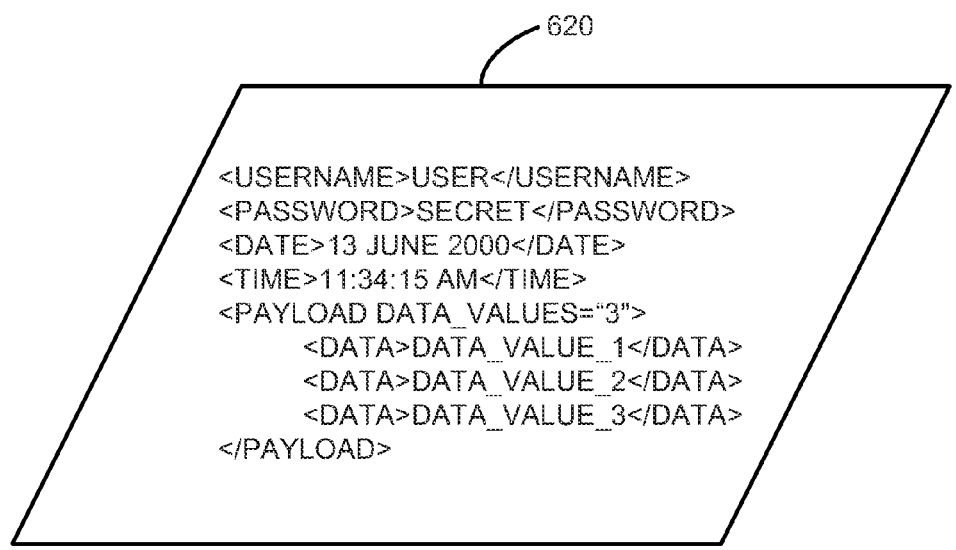

FIGS. 6A and 6B are illustrations of structured data sets conforming to different structured formats and including information from the messaging data sets illustrated in FIGS. 4 and 5, according to embodiments. A conversion module, for example, can generate structured data set 610 or structured data set 620 from messaging data set 400 and/or messaging data set 500. The structured format of structured data set 610 includes the following:
 a username data element (or field);
 a password data element separated from the username data element by a line break (e.g., a newline symbol followed by a carriage return symbol);
 a date data element separated from the password data element by a line break;
 a time data element separated from the date data element by a line break; and
 a data values (or payload) data element separated from the time data element by a line break.
In other words, structured data set 610 conforms to a line-delimited structured format.

The values of messaging data sets 400 and 500 can be extracted from (or identified within) messaging data sets 400 and 500 by, for example, parsing messaging data sets 400 and 500 with reference to the messaging format of each of messaging data sets 400 and 500 and inserted into the data elements of structured data set 610 as illustrated in FIG. 6A. More specifically:
 the username value, USER, of messaging data set 400 or messaging data set 500 can be inserted into the username data element;
 the password value, SECRET, of messaging data set 400 or messaging data set 500 can be inserted into the password data element;

the date portion, 13 Jun. 2000, of the date/time value, 960917655, of messaging data set 400 or messaging data set 500 can be decoded and inserted into the date data element;

the time portion, 11:34:15 AM, of the date/time value, 960917655, of messaging data set 400 or messaging data set 500 can be decoded and inserted into the time data element; and the set of data values, DATA_VALUE_1, DATA_VALUE_2 and DATA_VALUE_3, of messaging data set 400 or messaging data set 500 can be inserted into the data values data element.

The values of messaging data sets 400 and 500 can be inserted into the data elements of structured data set 610 by a conversion module for the messaging format of messaging data set 400 and the messaging format of messaging data set 500, respectively. A processing engine can then access the information (i.e., data values) from each of messaging data sets 400 and 500 at the data elements of structured messaging format 610. Thus, the processing engine can access information included in messaging data sets 400 and 500 without interpreting the messaging formats of messaging data sets 400 and 500.

Similarly, structured data set 620 is a markup data format (e.g., a data format based on opening and closing tags defining data elements) that includes the following tags defining data elements and attributes:

a username identifier (or tag), USERNAME, that defines a username data element;

a password identifier, PASSWORD, that defines a password data element;

a date identifier, DATE, that defines a date data element;

a time identifier, TIME, that defines a time data element;

a payload identifier, PAYLOAD, that defines a container for data value data elements and includes an attribute, DATA VALUES, that defines the number of data value elements included in the payload data element; and a data value identifier, DATA, that defines a data value element within a payload data element.

The values of messaging data sets 400 and 500 can be extracted from (or identified within) messaging data sets 400 and 500 by, for example, parsing messaging data sets 400 and 500 with reference to the messaging format of each of messaging data sets 400 and 500 and inserted into the data elements of structured data set 620 as illustrated in FIG. 6B. More specifically:

the username value, USER, of messaging data set 400 or messaging data set 500 can be inserted into the username data element;

the password value, SECRET, of messaging data set 400 or messaging data set 500 can be inserted into the password data element;

the date portion, 13 Jun. 2000, of the date/time value, 960917655, of messaging data set 400 or messaging data set 500 can be decoded and inserted into the date data element;

the time portion, 11:34:15 AM, of the date/time value, 960917655, of messaging data set 400 or messaging data set 500 can be decoded and inserted into the time data element; and the number of data values, 3, can be calculated or determined and inserted into the DATA_VALUES attribute of the payload data element; and each data value from the set of data values, DATA_VALUE_1, DATA_VALUE_2 and DATA_VALUE_3, of messaging data set 400 or messaging data set 500 can be inserted into a data value data element within the payload data element.

As illustrated in FIG. 6B, data elements are delimited by opening identifiers and corresponding closing identifiers. For example, opening identifier USERNAME has corresponding closing identifier /USERNAME, and the value of the username data element is located between the opening identifier and the closing identifier.

In some embodiments, structured data sets 610 and 620 can include other and/or fewer data elements than illustrated in FIGS. 6A and 6B. For example, structured data sets 610 and 620 can include a data element including an identifier related to (or associated with) the messaging format of the messaging data set converted to a structured data set. This data element can be useful, for example, to identify the conversion module to each be used to convert the structured data set to a messaging data set.

The values of messaging data sets 400 and 500 can be inserted into the data elements of structured data set 620 by a conversion module for the messaging format of messaging data set 400 and the messaging format of messaging data set 500, respectively. A processing engine can then access the information (i.e., data values) from each of messaging data sets 400 and 500 at the data elements of structured messaging format 620. Thus, the processing engine can access information included in messaging data sets 400 and 500 without interpreting the messaging formats of messaging data sets 400 and 500.

As discussed above, a processing engine can access the data elements of structured data sets 610 and 620 to alter the data values stored at those data elements. For example, a processing engine can insert a different username into a structured data element by accessing the username data element. After the processing engine has accessed the data elements, a structured data set can be converted to a messaging data set at a conversion module. The structured data set is converted to a messaging data set by inserting the values from the data elements of the structured data set into a messaging data set such that the values in the messaging data set conform to the messaging format for that messaging data set. For some messaging formats, for example, the messaging format of messaging data set 400 illustrated in FIG. 4, a conversion module can insert newline, \N, and carriage return, \R, symbols, calculate and insert a data bytes value, and/or calculate a checksum value for the messaging data set during conversion of a structured data set to a messaging data set. In other words, a conversion module can insert values into a messaging data set that are not included at data elements of a structured data set. For example, such values can be formatting or delimiting symbols, or can be calculated from values stored at data elements of a structured data set.

Referring to FIG. 2, similar to client device 210 and network service 240, client device 220 is in communication with network service 250 via communications link 230. More specifically, client device 220 sends and receives data sets that conform to a messaging format to and from, respectively, network service 250. As illustrated in FIG. 2, the messaging format of DS20 differs from the messaging format of DS10. In other words, the information included in data set DS20 is different from (e.g., different in kind or data type rather than different merely in value) and/or differently arranged (or formatted) than the information included in data set DS10. For example, data set DS20 can include different and/or rearranged data fields from the data fields of data set DS10.

As a specific example of communication between client device 220 and network service 250, client device 220 sends messaging data set DS20 to network service 250 via communications link 230. As data set DS20 traverses communications link 230, a copy of data set DS20 is sent to network traffic tool 260. Network traffic tool 260 receives data set DS20 and converts data set DS20 into structured data set SDS20. SDS20 is then stored at data store 270.

Structured data set and SDS10 and structured data set SDS20 share a common structured format. In other words, data sets DS10 and DS20 are converted into structured data sets having a common structured format. Said differently, data sets DS10 and DS20 are converted to a common (or shared) structured representation. Thus, information that is included in each of data sets DS10 and DS20 can be accessed (e.g., by network traffic tool 260) at a common data element of each of structured data sets SDS10 and SDS20, respectively. Accordingly, the structured data sets from structured data sets SDS30 stored at data store 270 share a common structured format.

Figure 7:
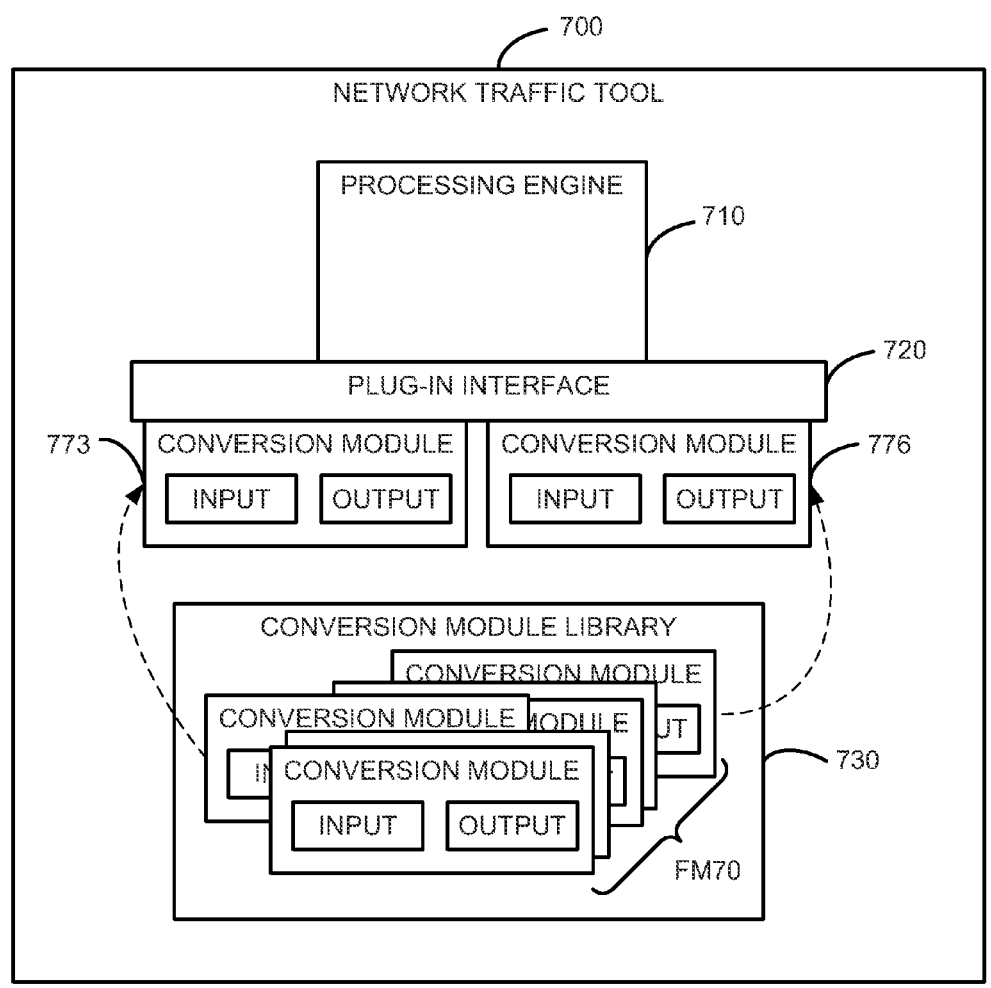
FIG. 7 is a schematic block diagram of a network traffic tool, according to an embodiment.

FIG. 7 is a schematic block diagram of a network traffic tool, according to an embodiment. As discussed above, a network traffic tool records, modifies, analyzes, and/or sends (e.g., replays) data sets. Network traffic tool 700 includes processing engine 710, plug-in interface 720, and conversion module library 730. Conversion module library 730 is a data store that includes plurality of conversion modules CM70. Conversion modules 773 and 776 are included within conversion module library 730.

As illustrated in FIG. 7, conversion modules include an input block and an output block. The input block is a module (e.g., a hardware module and/or a software module stored at a memory and executed at a processor) that converts messaging data sets to structured data sets. The output block is a module (e.g., a hardware module and/or a software module stored at a memory and executed at a processor) that converts structured data sets to messaging data sets. In some embodiments, conversion modules do not include an input block and an output block. Rather, the conversion modules convert messaging data sets to structured data sets and structured data sets to messaging data sets at a common block.

Processing engine 710 is a hardware module and/or a software module stored at a memory and executed at a processor that processes (e.g., records, modifies, analyzes, and/or sends (e.g., replays)) structured data sets. Processing engine 710 is configured to interpret structured data sets rather than messaging data sets. Said differently, processing engine 710 interprets data sets according to a structured format rather than according to multiple messaging formats. In some embodiments, processing engine 710 interprets data sets according to multiple structured formats. In some embodiments, processing engine 710 interprets data sets according to a structured format and according to multiple messaging formats. Furthermore, processing engine 710 can be an application-specific electronic circuit or combination of circuits, or an application (i.e., a software module) hosted at a computing device.

In some embodiments, processing engine 710 processes structured data sets that represent messaging data sets based on sequences of instructions, commands, or code that are executed or interpreted at processing engine 710. For example, processing engine 710 can interpret scripts that define how the structured data sets are processed. Because processing engine 710 interprets structured data sets, the scripts reference the structured data sets rather than the messaging data sets represented by the structured data sets. In other words, the scripts access information included in messaging data sets by accessing data elements of the structured data sets representing those messaging data sets. Thus, the scripts need not interpret and can be developed independent of the messaging formats of the messaging data sets.

Processing engine 710 is bound through plug-in interface 720 to conversion modules from conversion module library 730 to process message data formats. Plug-in interface 720 is an interface such as a dynamically loadable library interface that is in communication with processing engine 710 and to which conversion modules can be bound or operatively coupled during operation of network traffic tool 700. Said differently, conversion modules can be dynamically bound to processing engine 710 via plug-in interface 720.

For example, conversion module library 730 can include conversion modules that are defined by an end user of network traffic tool 700. In other words, conversion module library 730 can include conversion modules associated with messaging formats that processing engine 710 is not able to process (e.g., interpret and/or modify). Thus, the functionality of network traffic tool 700 can be extended (e.g., to process the messaging formats processing engine 710 is unable to process) by these conversion modules. More specifically, processing engine 710 can receive a messaging data set and determine that processing engine 710 is not able (e.g., does not include logic such as a hardware module and/or a software module stored at a memory and executed at a processor) to process that messaging data set. For example, processing engine 710 can determine that the messaging data set conforms to a messaging format that processing engine 710 is not able to process based on a value within the messaging data set such as a messaging format identifier, an Internet Protocol ("IP") port value of the messaging data set, a number of bytes in the messaging data set, and/or another property (e.g., attribute or parameter) of the messaging data set. Processing engine 710 can then provide the data set to one or more conversion modules from conversion module library 730 that are dynamically bound to the processing engine 710 via plug-interface 720 to convert the messaging data set into a structured data set for processing at processing engine 710.

As an example, as illustrated in FIG. 7, conversion modules 773 and 776 have been selected from conversion module library 730 and bound to processing engine 710 via plug-in interface 720. For example, network traffic tool 700 can select conversion modules 773 and 776 from conversion module library 730 based on a configuration file including parameters identifying conversion modules 773 and 776 to be bound to processing engine 710. Conversion module 773 can convert messaging data set conforming to the messaging format of messaging data set 400 of FIG. 4 to structured data sets conforming to the structured format of structured data set 620 of FIG. 6B, and conversion module 776 can convert messaging data set conforming to the messaging format of messaging data set 500 of FIG. 5 to structured data sets conforming to the structured format of structured data set 620 of FIG. 6B.

In some embodiments, conversion modules from conversion module library 730 can operate on a data set serially. Said differently, conversion modules from conversion module library 730 can be chained together within a network traffic tool such that the output of one conversion module from conversion module library 730 becomes the input to another conversion module from conversion module library 730. For example, the output of one conversion module can be provided to another conversion module using a pipe, shared memory, input and/or output redirection, and/or another interface provided by network traffic tool 700, plug-in interface 720, and/or processing engine 710.

As an example of a conversion module chain, conversion module 773 can convert messaging data sets conforming to a first messaging format to structured data sets conforming to a first structured format. Similarly, conversion module 776 can convert messaging data sets conforming to a second messaging format to structured data sets conforming to a second structured format. The first structured format can be the second messaging format or can include elements at which messaging data sets conforming to the second messing format are stored. Moreover, processing engine 710 can be able to process (e.g., include logic such as a hardware module and/or a software module stored at a memory and executed at a processor to interpret and/or modify) structured data sets conforming to the second structured format, but not structured data sets conforming to the first structured format. Conversion module 773 and conversion module 776 can be chained such that the output of conversion module 773 (i.e., structured data sets conforming to the first structured format) is provided to conversion module 776, and the output of conversion module 776 (i.e., structured data sets conforming to the second structured format) is provided to processing engine 710.

As a more specific example of chained conversion modules, a protocol of a network service can include voice over IP telephony ("VoIP") data that is compressed and encrypted. Thus, raw VoIP data (i.e., aural data) is compressed and then encrypted before being sent to the network service. Conversion module library 730 of network traffic tool 700 can include a first conversion module configured to decrypt the encrypted compressed aural data and produce (or output) a data set including the compressed raw VoIP data, a second conversion module configured to expand (or decompress) compressed aural data and produce a data set including the raw VoIP data, and a third conversion module to convert the raw VoIP data to a structured data set conforming to a structured format that processing engine 710 is able to process. The first conversion module, the second conversion module, and the third conversion module can be bound to processing engine 710 and chained such that the output of the first conversion module is the input to the second conversion module and the output of the second conversion module is the input to the third conversion module. For example, a configuration file of network traffic tool 700 can define the conversion module chain described above.

In some embodiments, processing engine 710 can execute within an environment (not shown) such as an operating system that provides an interface such as, for example, an application programming interface ("API") to bind a conversion module to processing engine 710. Said differently, the binding of the conversion module to processing engine 710 can be facilitated by an operating system. For example, the conversion module can be loaded by processing engine 710 as a dynamically loadable library within the environment, can communicate with processing engine 710 via a shared memory interface defined by the environment, can communicate with processing engine 710 via message passing through an environment, and/or can otherwise be bound to processing engine 710. In other words, plug-in interface 720 is a hardware module and/or software module such as instructions stored at a memory and executed at a processor that provides a dynamically loadable library interface, a communications interface such as a shared memory interface or a messaging passing interface, and/or another interface that can be established dynamically (i.e., during operation of processing engine 710) between a conversion module and processing engine 710.

Figure 8:
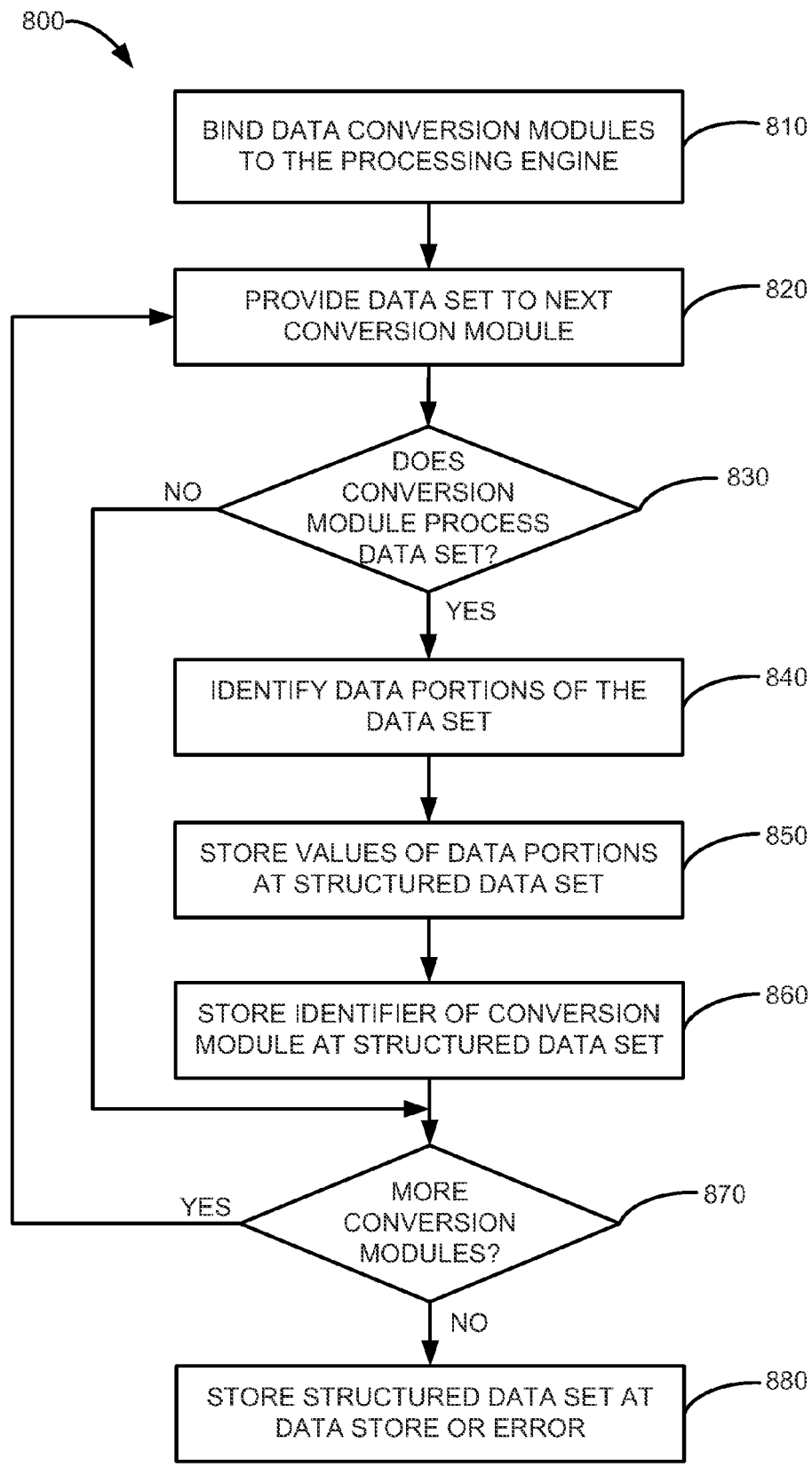
FIG. 8 is a flowchart of a process to generate a structured data set based on a messaging data set, according to an embodiment.

FIG. 8 is a flowchart of a process to generate a structured data set based on nested messaging data sets, according to an embodiment. Process 800 can be implemented as a hardware module and/or a software module. For example, process 800 can be implemented as application-specific circuitry or as a software module including instructions stored at a memory and executed at a processor in communication with the memory. As a specific example, process 800 can be implemented at a network traffic tool including a plurality of conversion modules that can be bound to a processing engine via a plug-in interface. A conversion module is bound to the processing engine via a plug-in interface at block 810. More specifically, the conversion module is bound to the processing engine by establishing or defining a communications path between the conversion module and the processing engine. That is, the conversion module is bound to the processing engine when the processing engine can exchange information (e.g., data sets) with the conversion module.

A messaging data set received at the network traffic tool and is provided at block 810 to a conversion module bound to the processing engine at block 820. In other words, the data set is provided to a conversion module from the conversion modules bound to processing engine. For example, the data set can be provided to the first conversion module bound to the processing engine, the last conversion module bound to the processing engine, or to another conversion module bound to the processing engine such as a conversion module specified in a configuration file interpreted by the processing engine. As a specific example, the data set can be provided to the first conversion module in a conversion module chain.

The conversion module to which the data set was provided at block 820 then determines whether that conversion module can process the data set at block 830. For example, a conversion module can include logic such as a hardware module and/or a software module stored at a memory and executed at a processor to identify a messaging format with which that conversion module is associated. If the data set does not conform to that messaging format, process 800 can proceed to block 870 to determine whether additional conversion modules are bound to the processing engine. If additional conversion modules are bound to the processing engine, process 800 returns to block 820 and the data set is provided to another conversion module. If additional conversion modules are not bound to the processing engine, process 800 can proceed to block 880 and generate an error condition is a structured data set has not been generated. In other words, process 800 can generate an error condition if there is no conversion module bound to the processing engine that can process the data set.

If the data set conforms at block 830 to a messaging format that conversion module can process, process 800 can proceed to block 840 to identify data portions of the data set and values from those data portions are stored at data elements of a structured data set at block 850. In other words, a structured data set is generated at blocks 840 and 850. More specifically, the processing engine can provide the data set to the conversion module and the conversion module can identify various sections of the messaging data set and store values of these sections at data elements of the structured data set. For example, as discussed above in relation to FIGS. 4, 5, 6A, and 6B, values and/or groups of values from the messaging data set can be identified within the messaging data set and stored at appropriate data elements of the structured data set. In other words, the messaging data set can be converted to a structured data set. Additionally, an identifier of the conversion module to which the data set was provided at block 820 is stored at the structured data set at block 860. This identifier can be accessed, for example, by a processing engine to select a conversion module to generate a messaging data set from the structured data set. Alternatively, an identifier of the messaging format of the messaging data set from which the structured data set was generated can be stored at the structured data set at block 860. Similarly, this identifier can be accessed, for example, by a processing engine to select a conversion module to generate a messaging data set from the structured data set.

Whether the structured data set generated at blocks 840 and 850 should be provided to another conversion module is determined at block 870. For example, the structured data set can be provided to another conversion module in a conversion module chain if the conversion module to which the data set was provided at block 820 is part of that conversion module chain. In some embodiments, a data set (and resulting structured data sets) is provided to each conversion module bound to the processing engine. In other words, each conversion module bound to the processing engine can be chained together by default or in response to a parameter from a configuration file interpreted by the processing engine. In some embodiments, a data set is provided to each conversion module bound to the processing engine until a structured data set conforming to a structured format the processing engine can process is generated. After such a structured data set is generated, that structured data set can be provided to the processing engine.

After there are no more conversion modules at block 870, process 800 proceeds to store the structured data set at a data store at block 880. Thus, the structured data set can be later accessed by the processing engine to replay and/or modify the data set (e.g., a messaging data set) from which the structured data set was generated.

Process 800 can include blocks in addition to those illustrated in FIG. 8. Additionally, one or more blocks can be rearranged. Furthermore, although process 800 is discussed above with reference to a network traffic tool, process 800 is applicable within other environments. In some embodiments, data portions of a data set (such as a messaging data set) can include nested messaging data sets. In other words, a messaging data set can include another messaging data set. The other (or nested) messaging data set can conform to a messaging format that is the same as or different from the messaging format of the original (or nesting) messaging data set. If the messaging data set includes such a nested messaging data set at block 870, the conversion module can include the nested messaging data set within a data element of the structured data set and notify (e.g., provide a request or signal to) the processing engine to further process the structured data set generated by the conversion module to convert the nested messaging data set to a structured data set. Accordingly, process 800 returns to block 820 and the nested messaging data set can be processed at a different conversion module. In some embodiments, the conversion module does not notify the processing engine to further process a structured data set including a nested messaging data set. Rather a conversion module chain can be defined (e.g., within a configuration file interpreted by the processing engine) and that structure data set can be provided to the next conversion module in the conversion module chain at block 820 after block 870.

Blocks 820 through 870 can be repeated until the original messaging data set and all nested messaging data set have been converted to structured data sets. For example, the structured data set generated by the conversion module selected in a previous iteration of blocks 820 to 870 can have data elements that include the nested messaging data sets, and the nested messaging data set can be provided to another conversion module (i.e., a conversion module selected in a current or subsequent iteration of blocks 820 to 870) for conversion to another structured data set. The structured data set resulting from the conversion can be stored at the data element of the structured data set that included the messaging data set presently converted. The result of this process is a structured data set including one or more nested structured data sets. In other words, the structured data set includes nested structured data sets within data elements of the structured data sets. This resulting structured data set can be stored at a data store at block 880. Furthermore, although processing of nested messaging data sets is discussed as an outside-in process (i.e., nesting messaging data sets are processed before nested messaging data sets), such processing can be performed as an inside-out process (i.e., nested messaging data sets are processed before nesting messaging data sets are fully processed).

Figure 9:
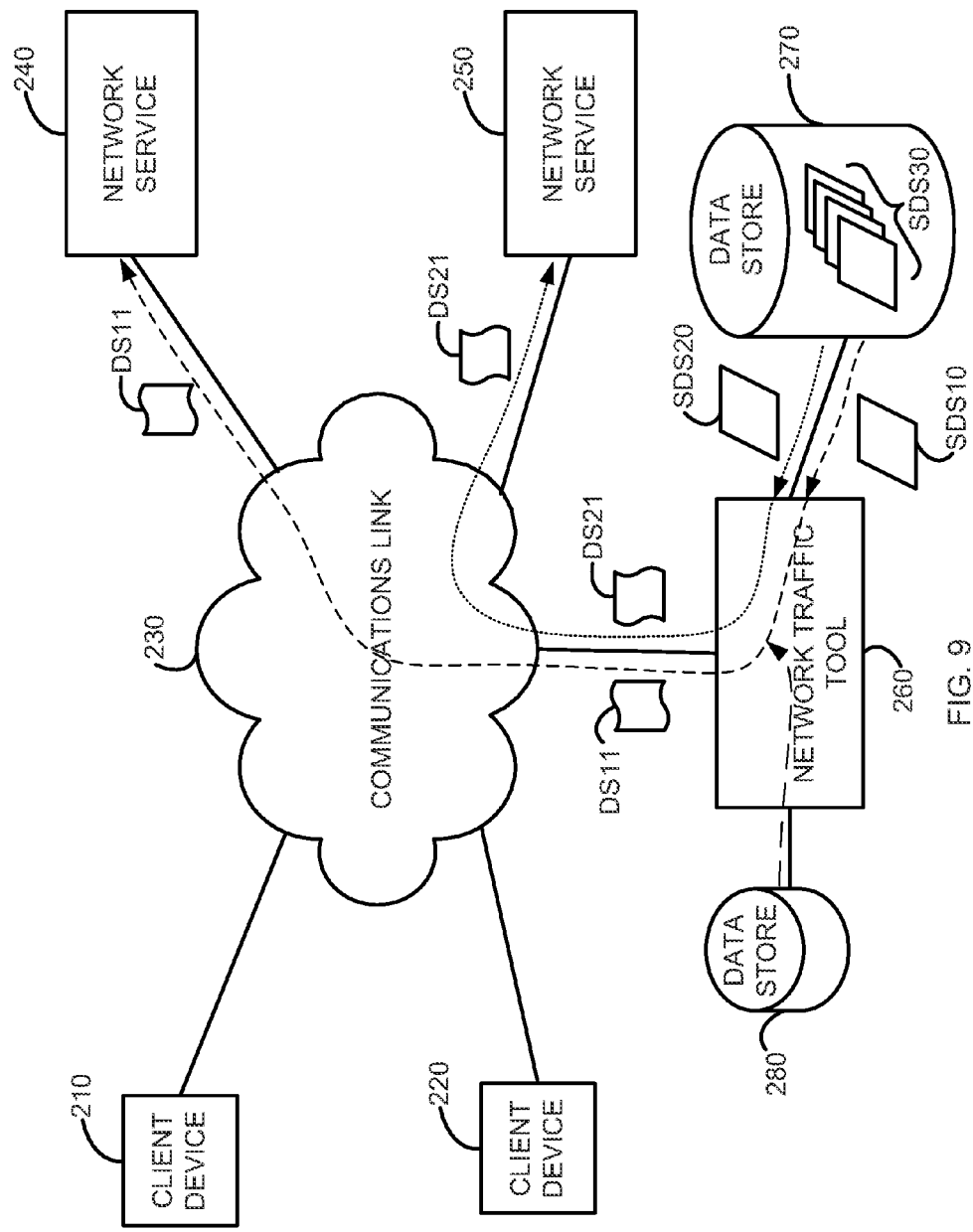
FIG. 9 is a schematic block diagram of the system of FIG. 2 illustrating a communication flow of messaging data sets within the system, according to an embodiment.

FIG. 9 is a schematic block diagram of the system of FIG. 2 illustrating a communication flow of messaging data sets within the system, according to an embodiment. For example, network traffic tool 260 can replay a communication session between network service 250 and client device 220 from the perspective of client device 220 by sending to network service 250 messaging data sets previously sent to network service 250 by client device 220 and stored as structured data sets at data store 270 by network traffic tool 260, as discussed in relation to FIG. 2. Similarly, network traffic tool 260 can replay a communication session between network service 240 and client device 210 from the perspective of client device other than client device 210 by sending to network service 240 messaging data sets previously sent to network service 240 by client device 210, stored as structured data at data store 270 sets by network traffic tool 260 and modified by network traffic tool using parameters (or values) stored at data store 280.

As illustrated in FIG. 9, network traffic tool 260 accesses structured data set SDS20 at data store 270 to replay a communication session with network service 250. Network traffic tool 260 converts structured data set SDS20 to messaging data set DS21, for example, as discussed above in relation to FIGS. 4, 5, 6A, and 6B. Network traffic tool 260 then sends messaging data set DS21 to network service 250. During replay of the communication session, in addition to messaging data sets sent from network traffic tool 260 to network service 250, network service 250 sends responsive messaging data sets to network traffic tool 260. Network traffic tool 260 receives the responsive messaging data sets, converts the responsive messaging data sets to structured data sets, and processes (e.g., analyzes and/or stores) the structured data sets. For example, network traffic tool 260 can replay a communication session and analyze the responsive messaging data sets from network service 250 to determine whether network service 250 is operating properly.

Also as illustrated in FIG. 9, network traffic tool 260 can modify a communication session with a network service based on parameters stored at data store 280, for example. More specifically, for example, network traffic tool 260 accesses structured data set SDS10 at data store 270. Before converting structured data set SDS10 to a messaging data set, network traffic tool 260 accesses a parameter (or value) at data store 280 and replaces the value at a data element of structured data set SDS10 with the parameter from data store 280. In other words, network traffic tool 260 can manipulate (e.g., alter or modify) values at data elements of structured data sets with parameters from data store 280 to replay an altered or modified communication session. For example, network traffic tool 260 can alter a username value, a password value, a time value, an IP address, a data value, and/or other value stored at a structured data set. When that structured data set is converted to a messaging data set, the resulting messaging data set is different from the messaging data set from which the structured data set was generated. Thus, a previous communication session can be altered to test various functionalities, operating conditions, and/or other aspects of a network service. Said differently, one live (i.e., between a client device and network service) communication session can be captured (or recorded) as a sequence of structured data sets and that communication session can be replayed in multiple altered forms to test or observe at a network traffic tool various functionalities or operations of the network service independent of a client device.

As discussed above in relation to FIG. 7, network traffic tool 260 can include a processing engine (not shown) that interprets or executes instructions or groups of instructions (or scripts). Such scripts can include instruction that are interpreted at the processing engine that cause the processing engine to replace particular values stored at data elements of structured data sets with particular parameters from data store 280. Additionally, such scripts can be interpreted at the processing engine to cause the processing engine to generate records (or logs) of the messaging data sets and/or specific values in messaging data sets sent from and/or received at analysis engine 260 by accessing the data elements of the structured data sets representing those messaging data sets. Moreover, such scripts can be interpreted at the processing engine to cause the processing engine to perform various analyses of the messaging data sets and/or specific values in messaging data set sent from and/or received at analysis engine 260 by accessing the data elements of the structured data sets representing those messaging data sets. Because the processing engine can access the structured data sets that represent messaging data sets sent from and received at analysis engine 260, the scripts interpreted by the processing engine can be agnostic to the messaging format of the messaging data sets and can, rather, access values from the messaging data sets by reference to the data elements of the structured data sets representing the messaging data sets.

Figure 10:
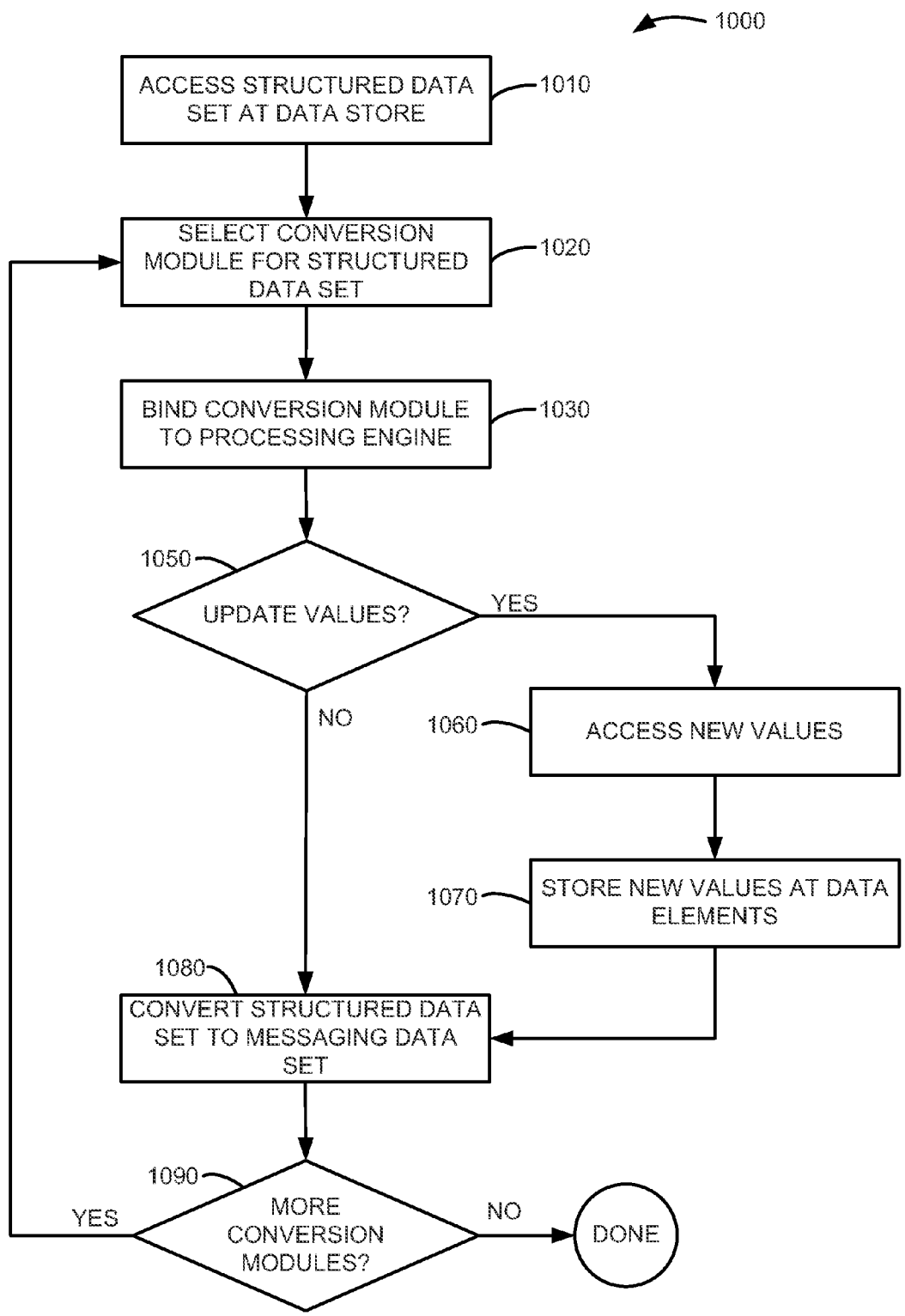
FIG. 10 is a flowchart of a process to generate a messaging data set based on a structured data set, according to an embodiment.

FIG. 10 is a flowchart of a process to generate a messaging data set based on a structured data set, according to an embodiment. Process 1000 can be implemented as a hardware module and/or a software module. For example, process 1000 can be implemented as application-specific circuitry or as a software module including instructions stored at a memory and executed at a processor in communication with the memory. As a specific example, process 1000 can be implemented at a network traffic tool including a plurality of conversion modules that can be bound to a processing engine via a plug-in interface.

A structured data set is accessed at block 1010. For example, a structured data set can be accessed by a processing engine at a data store including structured data sets generated from messaging data sets. A conversion module is selected for the structured data set at block 1020. For example, the structured data set can include an identifier of a conversion module that generated the structured data set at an element of field of the structured data set and the processing engine can select the conversion module at block 1020 based on that identifier. Alternatively, the structured data set can include an identifier of the messaging format of the messaging data set from which the structured data set was generated, and the conversion module can be selected based on that identifier. In some embodiments, as illustrated in FIG. 10, and the conversion module is bound to a processing engine at block 1030 after the conversion module is selected.

Process 1000 then continues to block 1050 to determine whether values stored at data elements of the current structured data set should be updated (e.g., manipulated, altered, modified, and/or replaced). For example, a processing engine can interpret a script including instructions that cause the processing engine to update particular values of the current structured data set. If values should be updated, the new values are accessed at block 1060. For example, new (or updating) values can be accessed at a data store including parameters for updating values of data elements of structured data sets. In some embodiments, a new value such as a time value can be generated or defined locally at or internal to a processing engine. The new values are then stored at the data elements of the current structured data set at block 1070.

Following block 1070 and block 1050 if no values at the structured data set will be updated, the current structured data set is converted to a messaging data set at block 1080. For example, a structured data set can be converted to a messaging data set as discussed in relation to FIGS. 4, 5, 6A, and 6B. In some embodiments, a conversion module can calculate values such as a checksum, a time value, a data length or quantity value, and/or some other value during conversion of the structured data set to a messaging data set. As a specific example, a conversion module can calculate a data length value and a checksum value and include the data length value and the checksum value in a messaging data set if the value of a data element of the structured data set converted to the messaging data set was previously modified by a processing engine.

At block 1090, process 1000 returns to block 1020 if the current structured data set should be processed by additional conversion modules. For example, process 1000 can return to block 1020 if the structured data set accessed at 1010 should be processed by a conversion module chain and the current conversion module is not the final conversion module in the conversion module chain. A processing engine can determine that a structured data set (or the messaging data set generated from a structured data set) should be provided to additional conversion modules based on, for example, identifiers of the conversion modules in the conversion module chain stored at that structured data set. In other words, each conversion module in the conversion module chain can insert an identifier of that conversion module (or a messaging format associated with that conversion module) at the structured data set when that structured data set is generated, for example, as illustrated in FIG. 8. Those identifiers can be accessed at block 1090 and/or block 1020 to determine that a structured data set should be provided to additional conversion modules and/or to select those conversion modules, respectively.

Typically, those identifiers will be accessed within process 1000 in a reverse order from the order in which they were added to the structured data set. In other words, conversion module chains are applied in a reverse order within process 1000 from the order in which they are applied, for example, in process 800. Blocks 1020 through 1090 are repeated until all appropriate conversion modules have processed the structured data set (or the messaging data sets generated from a structured data set). In other words, blocks 1020 through 1090 are repeated until all structured data set have been converted to corresponding messaging data sets.

Process 1000 can include blocks in addition to those illustrated in FIG. 10. Additionally, one or more blocks can be rearranged. For example, conversion modules can be bound to the processing engine before the conversion module for a structured data set is selected at block 1020. Thus, the processing engine can select a conversion module that is currently bound to the processing engine for a structured data set. Furthermore, although process 1000 is discussed above with reference to a network traffic tool, process 1000 is applicable within other environments.

In some embodiments, elements of a structured data set can include nested structured data sets. In other words, a structured data set can include another structured data set. The other (or nested) structured data set can conform to a structured format that is the same as or different from the structured format of the original (or nesting) structured data set. If the structured data set accessed at 1010 includes such a nested structured data set, for example, at block 1050, process 1000 can be invoked for the nested structured data set. In other words, the nested structured data set can be converted to a messaging data set that is included within the element of the structured data set accessed at block 1010 before process 1000 proceeds to update values of the structured data set accessed at block 1010. The processing of nested structured data sets can be repeated recursively to process nested structured data sets that include other nested data sets. In other words, process 1000 can be invoked for each nested structured data set of a nesting data set before process 1000 completes for the nesting data set. Furthermore, although processing of nested structured data sets is discussed as an inside-out process (i.e., nested structured data sets are processed before nesting structured data sets are fully processed), such processing can be performed as an outside-in process (i.e., nesting structured data sets are processed before nested structured data sets).

In some communication sessions between, for example, a client device and a network service, the network service provides data to the client device that is used later during the communication session. For example, a network service can provide a session key in response to a valid username and password pair received from the client device. Typically, the session key is not related to the username and password pair and is different for each communication session. Thus, during replay of a communication session, a previously used session key (e.g., a session key included in structured data sets representing the messaging data sets of a previous communication session) should be replaced by a session key for the current (i.e., the replaying) communication session. The process of replacing expired or currently invalid values within current values received during a communications session is referred to herein as correlation.

Figure 11:
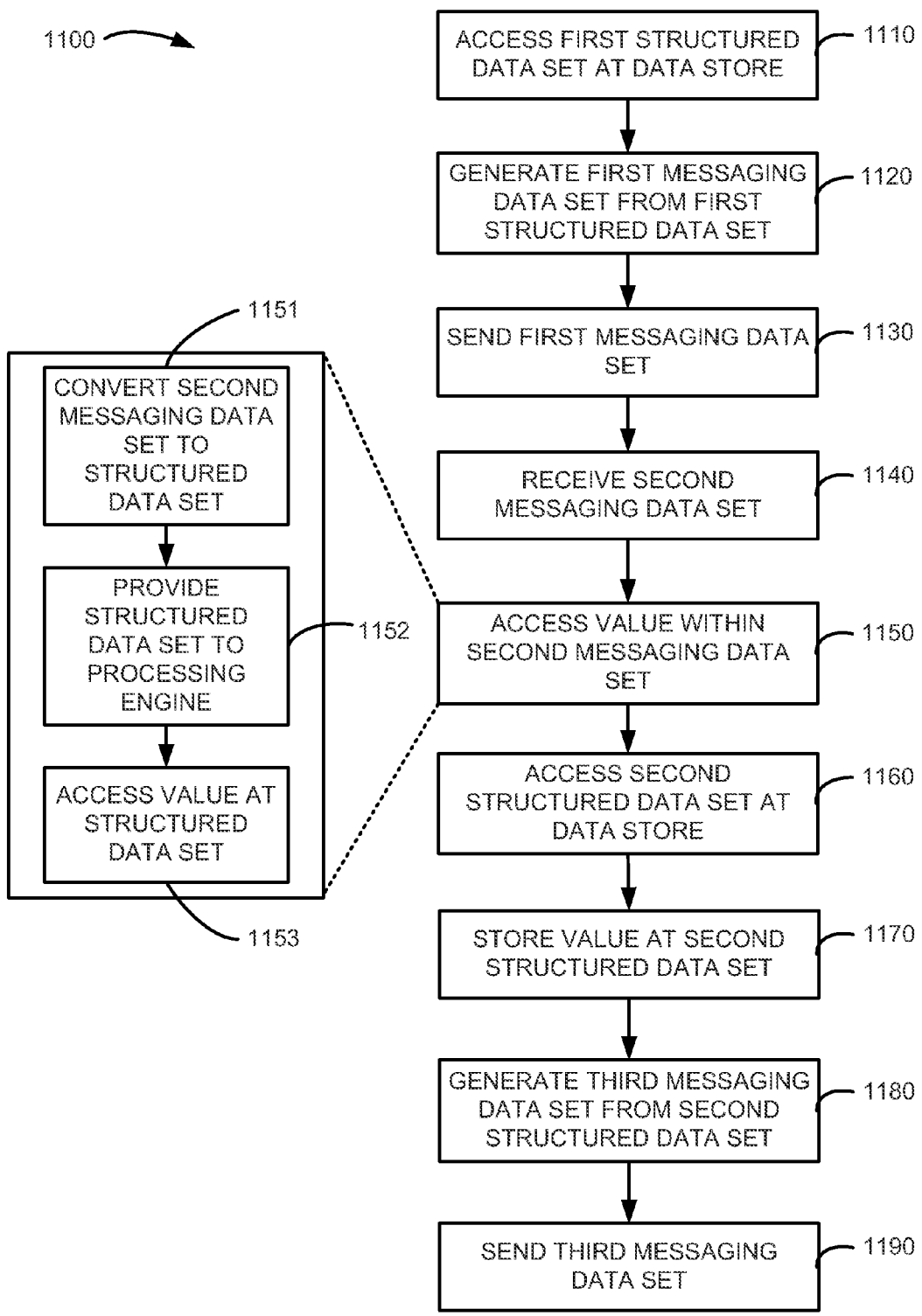
FIG. 11 is a flowchart of a process to correlate data values in multiple messaging data sets based on structured data sets, according to an embodiment.

FIG. 11 is a flowchart of a process to correlate data values in multiple messaging data sets based on structured data sets, according to an embodiment. Process 1100 can be implemented as a hardware module and/or a software module. For example, process 1100 can be implemented as application-specific circuitry or as a software module including instructions stored at a memory and executed at a processor in communication with the memory. As a specific example, process 1100 can be implemented at a network traffic tool including a plurality of conversion modules that can be bound to a processing engine via a plug-in interface.

A first structured data set is accessed at a data store at block 1110 and a first messaging data set is generated from the first structured data set at block 1120. As discussed above, in some embodiments values stored at data elements of the first structured data set are modified before the first messaging data set is generated. The first messaging data set is then sent at block 1130. For example, the first messaging data set can include a username and password pair selected from a data store and sent to a network service as login credentials for a communications session.

A second messaging data set is received at block 1140 in response to the first messaging data set. To continue the preceding example, the second messaging data set can include a session key for a communication session initiated by the first messaging data set. As discussed above, the session key will be used in each subsequent messaging data set during the communication session. Thus, a network traffic tool implementing process 1100 should include the session key in the remaining messaging data sets of the communication session by replacing the session key included in the messaging data sets recorded earlier and represented by structured data sets.

The value (e.g., the session key) at the second messaging data set is accessed at block 1150. More specifically, the second messaging data set is converted to a structured data set at block 1151 by a conversion module and provided to the processing engine at block 1152. At block 1153 the processing engine accesses the value at a data element of the structured data set related to the value. For example, a structured data set can include a session key data element and the session key included in the second messaging data set can be included at the session key data element.

A second structured data set (i.e., the structured data set representing the next messaging data set in the communication session that is being replayed) is accessed at the data store at block 1060. The value (e.g., the session key) is then stored (or inserted) at the structured data set at block 1170. For example, the value can replace another value at a data element of the structured data set. To further the preceding example, the session key can replace the current value of the session key data element of the structured data set. Said differently, the value can be used to correlate the second structured data set (and the third messaging data set that will be generated therefrom) to the current communication session.

A third messaging data session is then generated from the second structured data set, which now includes the value from the second messaging data set, at block 1180 and is then sent at block 1190. Process 1100 can include blocks in addition to those illustrated in FIG. 11. Additionally, one or more blocks can be rearranged. For example, process 1100 or sub-portions thereof can be repeated during the communication session to correlate other messaging data sets to the current communication session. More specifically, for example, another messaging data set can be received that includes a value to be included in future messaging data sets sent by the network traffic tool. As another example, the network traffic tool can continue to insert the value received within the second messaging data set into the remaining structured data sets of the communication session before those structured data sets are converted to messaging data sets and sent. Furthermore, although process 1100 is discussed above with reference to a network traffic tool, process 1100 is applicable within other environments.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual machine hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple processors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

Figure 12:
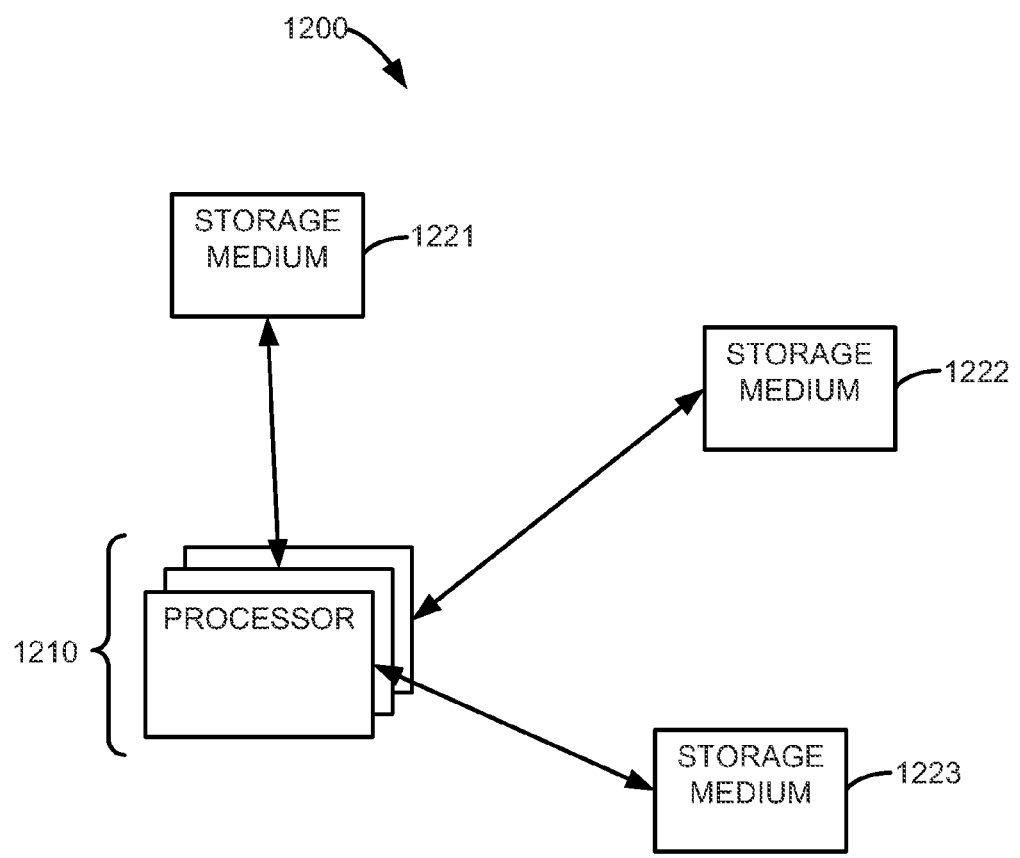
FIG. 12 is a schematic block diagram of a system including a processor and storage media, according to an embodiment.

As an example of a system including one or more processors and processor-readable storage media, FIG. 12 is a schematic block diagram of system 1200 including a processor and storage media, according to an embodiment. As illustrated in FIG. 12, system 1200 includes one or more processors 1210 operatively coupled to storage medium 1221, storage medium 1222, and storage medium 1223. One or more processors 1210 can access instructions or code at storage medium 1221, storage medium 1222, and storage medium 1223. Storage media 1221, 1222, and 1223 can be any processor-readable media and/or related devices to access processor-readable media. For example, storage medium 1221 can be a hard disk drive including a magnetic storage medium, storage medium 1222 can be an optical drive such as a DVD drive and can accept DVD storage media on which processor-readable instructions can be stored, and storage medium 1223 can be a FLASH memory drive with a Universal Serial Bus ("USB") interface. In some embodiments, storage media 1221, 1222, and/or 1223 can be local to (e.g., coupled to a common computing device) one or more processors 1210. In some embodiments, storage media 1221, 1222, and/or 1223 can be remote from (e.g., coupled to a separate computing device) one or more processors 1210 and in communication with one or more processors 1210 via communications link. Furthermore, one or more of storage media 1221, 1222, and/or 1223 can be local to one or more processors 1210 and one or more of the remaining of storage media 1221, 1222, and/or 1223 can be remote from one or more processors 1210.

As a more specific example, one or more processors 1210 can be included within a computing device having a hard disk drive represented by storage medium 1221 and a DVD drive including DVD media represented by storage medium 1222. The computing device can also include a USB host controller to communicate with a FLASH memory drive represented by storage medium 1223. One or more processors 1210 can access processor-readable instructions such as processor-readable instructions that implement an operating system, software application, and/or one or more processes at any of storage media 1221, 1222, and/or 1223. Said differently, one or more processors 1210 can interpret or execute instructions at processor-readable media via storage medium 1221, storage medium 1222, and/or storage medium 1223. In some embodiments, system 1200 can include one or more memories such as RAM that function as a cache between one or more of storage medium 1221, storage medium 1222, and/or storage medium 1223 and one or more processors 1210 for instructions or code stored (or accessible) at one or more of storage medium 1221, storage medium 1222, and/or storage medium 1223.

While certain embodiments have been shown and described above, various changes in form and details may be made. For example, some features of embodiments that have been described in relation to one embodiment and/or process at a network traffic tool can be distributed to other modules. Additionally, embodiments described in relation to a replay of messaging data sets from a network traffic tool to a network service can be applicable to replay of messaging data sets from a network traffic tool to a client device. In other words, processes, features, and/or properties of various embodiments described in relation to an exchange of messaging data sets between a network traffic tool and a network service can be useful in exchanges of messaging data sets between a network traffic tool and a client device. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. A method of altering a messaging data set, comprising:
   binding a plurality of data conversion modules to a processing engine;
   providing a first messaging data set to a conversion module from the plurality of conversion modules, wherein the first messaging data set conforms to a messaging format;
   receiving a structured data set based on a first data portion of the first messaging data set and based on a second data portion of the first messaging data set, wherein the first data portion includes a first value and the second data portion includes a second value;
   storing a third value different from the first value of the first data portion within a first element of the structured data set, wherein the first element of the structured data set is associated with the first data portion;
   storing the second value of the second data portion within a second element of the structured data set, wherein the second element of the structured data set is associated with the second data portion; and
   generating a second messaging data set based on the structured data set, wherein the second messaging data set conforms to the messaging format, wherein a first message of the second messaging data set is utilized to initiate a communication session and wherein a session key that is received via the communication session is stored to an element of the structured data set and utilized by the remaining messages of the second messaging data set during the communication session.

2. The method of claim 1, wherein the structured data set is a first structured data set, the method further comprising:
   identifying a third data portion and a fourth data portion within the value of the second data portion, the third data portion having a value, the fourth data portion having .a value;
   storing a value other than the value of the third data portion within a first element of a second structured data set, the first element of the second structured data set associated with the third data portion; and storing the value of the fourth data portion within a second element of a second structured data set, the second element of the second structured data set associated with the fourth data portion.

3. The method of claim 1, wherein the structured data set is a first structured data set, the method further comprising:

identifying a third data portion and a fourth data portion within the value of the second data portion, the third data portion having a value, the fourth data portion having a value;

storing a value other than the value of the third data portion within a first element of a second structured data set, the first element of the second structured data set associated with the third data portion;

storing the value of the fourth data portion within a second element of a second structured data set, the second element of the second structured data set associated with the fourth data portion; and storing the second structured data set at the second element of the structured data set.

4. The method of claim 1, wherein the structured data set is a first structured data set conforming to a structured format, the method further comprising:

receiving a third messaging data set including a data portion having the value different from the value of the first data portion;

generating a second structured data set having a data element, the data element having the value different from the value of the first data portion; and accessing the value different from the value of the first data portion at the data element of the second structured data set.

5. The method of claim 1, wherein the conversion module is a first conversion module, the structured data set is a first structured data set, the messaging format is a first messaging format, the value of the second data portion of the first messaging data set is a third messaging data set, the third messaging data set conforms to a second messaging format different from the first messaging format, the method further comprising:

selecting a second conversion module from the plurality of conversion modules based on the third messaging data set;

dynamically binding the second data conversion module to a processing engine;

generating a second structured data set based on the third messaging data set at the second data conversion module; and storing the second structured data set at the second element of the first structured data set.

6. A non-transitory processor-readable medium storing code representing instructions to cause a processor to perform a process, the code comprising code executable to:

dynamically load a first conversion module and a second conversion module;

generate at the first conversion module a first structured data set based on a first messaging data set, the first messaging data set conforming to a first messaging format and including a data portion having a first value, the first structured data set conforming to a structured format and including a data element having the first value;

generate at the second conversion module a second structured data set based on a second messaging data set, the second messaging data set conforming to a second messaging format different from the first messaging format and including a data portion having a second value, the second structured data set conforming to the structured format and including a data element having the second value;

receive the first structured data set from the first conversion module;

store a third value at the data element of the first structured data set;

receive the second structured data set from the second conversion module;

store a fourth value at the data element of the second structured data set; and generate a third messaging data set based on the second structured data set, wherein the third messaging data set conforms to the second messaging format, wherein a first message of the third messaging data set is utilized to initiate a communication session and wherein a session key that is received via the communication session is stored to an element of the second structured data set and utilized by the remaining messages of the third messaging data set during the communication session.

7. The non-transitory processor-readable medium of claim 6, the code further comprising code executable to:

access the first conversion module and the second conversion module at a conversion module library storing a plurality of conversion modules, the plurality of conversion modules including the first conversion module and the second conversion module.

8. The non-transitory processor-readable medium of claim 6, wherein:

the first conversion module is selected before the dynamically loading from a plurality of conversion modules based on the first messaging data set; and the second conversion module is selected before the dynamically loading from the plurality of conversion modules based on the second messaging data set.

9. The non-transitory processor-readable medium of claim 6, wherein the data element of the second structured data set is a first data element, the code further comprising code executable to:

access a second data element of the second structured data set, the second data element of the second structured data set conforming to the first messaging format;

provide the second data element of the second structured data set to the first conversion module; and generate at the first conversion module a third structured data set based on the second data element of the second structured data set.

10. The non-transitory processor-readable medium of claim 6, the code further comprising code executable to:

access the first structured data set at a data store;

provide the first structured data set to the first conversion module, the data element of the first structured data set having the third value;

generate, at the first conversion module, a fourth messaging data set based on the first structured data set, the fourth messaging data set conforming to the first messaging format and including a data portion having the third value;

access the second structured data set at the data store;

provide the second structured data set to the second conversion module, the data element of the second structured data set having the fourth value; and generate, at the second conversion module, a fourth messaging data set based on the second structured data set, the fourth messaging data set conforming to the second messaging format and including a data portion having the fourth value.

11. A network traffic tool system, comprising:
a processing engine to store a first value at a data element of a first structured data set in response to a first instruction and a second value at a data element of a second structured data set in response to a second instruction, the first structured data set conforming to a structured format, the second structured data set conforming to the structured format;
a first conversion module to generate a first messaging data set based on the first structured data set, the first messaging data set conforming to a first messaging format and including a data portion having the first value;
a second conversion module to generate a second messaging data set based on the second structured data set, the second messaging data set conforming to a second messaging format and including a data portion having the second value, wherein a first message of the second messaging data set is utilized to initiate a communication session and wherein a session key that is received via the communication session is stored to an element of the structured data set and utilized by the remaining messages of the second messaging data set during the communication session; and
a plug-in interface in communication with the processing engine to bind the first conversion module and the second conversion module to the processing engine.

12. The system of claim 11, further comprising:
a conversion module library storing a plurality of conversion modules, the plurality of conversion modules including the first conversion module and the second conversion module.

13. The system of claim 11, wherein:
the first conversion module is operable to access a data element of the second structured data set; and
the first conversion module is operable to generate a third messaging data set based on the data element of the second structured data set, the third messaging data set conforming to the first messaging format.

14. The system of claim 11, wherein:
the processing engine is operable to receive a third structured data set from the first conversion module; and
the processing engine is operable to access the first value at a data element of the third structured data set, the third structured data set based on a third messaging data set conforming to the first messaging format.

15. The system of claim 11, wherein:
the first conversion module is operable to define a third value based on a data element of the first structured data set; and
the first conversion module is operable to store the third value at the first messaging data set.

* * * * *